United States Patent [19]
Krüger

[11] 3,988,422
[45] Oct. 26, 1976

[54] METHOD OF TREATING CONVERTER GAS
[75] Inventor: Berthold Krüger, Wanne-Eickel, Germany
[73] Assignee: Gottfried Bischoff Bau Kompl. Gasreinigungs- und Wasserruckkuhlungsanlagen KG, Essen, Germany
[22] Filed: Oct. 7, 1974
[21] Appl. No.: 512,606

[30] Foreign Application Priority Data
Oct. 11, 1973 Germany............................ 2350956

[52] U.S. Cl............................... 423/232; 423/215.5
[51] Int. Cl.²......................................... B01D 53/34
[58] Field of Search................. 423/215.5, 210, 220, 423/232, 274, 430, 432, 635, 155, 158, 164, 165, 640, 626; 55/84

[56] References Cited
UNITED STATES PATENTS
| | | | |
|---|---|---|---|
| 1,377,363 | 5/1921 | Moon | 423/215.5 |
| 2,692,815 | 10/1954 | Walter | 423/215.5 |

*Primary Examiner*—Earl C. Thomas
*Attorney, Agent, or Firm*—Karl F. Ross; Herbert Dubno

[57] ABSTRACT

Sodium carbonate is added to water used to scrub converter gases so that calcium-oxide particles in the gas react with the aqueous sodium carbonate and a thin inactive film of calcium carbonate is formed on the calcium-oxide particles, using carbon dioxide in the gas for the reaction. The coated particles are then separated from the wash water by settling and sedimentation and the wash water is recycled with the addition of more sodium carbonate and water.

4 Claims, 2 Drawing Figures

METHOD OF TREATING CONVERTER GAS

FIELD OF THE INVENTION

The present invention relates to a method of removing particles from gas. More particularly this invention concerns a system for scrubbing waste converter gas.

BACKGROUND OF THE INVENTION

In the scrubbing of converter gases containing calcium-oxide particles and carbon dioxide with water it is a standard practice to recirculate the scrubbing water and then to settle out the particles, decanting and recycling the liquid. Fresh water is added to the wash water to make up losses.

A particular problem with such arrangements is that dust particles and calcium deposit in the water-recirculating system. These deposits are a result of the fact that the calcium-oxide particles picked up by the wash water form soluble calcium hydroxide which dissolves. The calcium ion combines with the carbon dioxide in the water to form insoluble calcium carbonate ($CaCO_3$).

It has been attempted to avoid these deposits by adding products to the water which ensure the precipitation of the dissolved calcium in the form of insoluble calcium compounds prior to recirculation. The additives necessary to accomplish this are relatively expensive and must be used in relatively large quantities, i.e., at least stoichiometrically equivalent to the calcium content of the gas treated. Approximately 75% of the wash water must be replaced with fresh water in conventional systems. Obviously such a system leads to further difficulties in the disposal of the contaminated wash water and the supply of the necessary large quantities of fresh water.

OBJECTS OF THE INVENTION

It is therefore an object of the present invention to provide an improved method of scrubbing particle-containing (e.g. metallurgical converter) gases.

Another object is the provision of an improved system for cleaning waste converter or stack gases.

Yet another object is to provide such a system wherein the formation of deposits in the wash-water circulating system is avoided.

SUMMARY OF THE INVENTION

The invention resides in scrubbing a gas containing calcium-oxide particles with an aqueous solution of the carbonate ion ($CO_3^=$) or the hydrogen carbonate ion ($HCO_3^-$) prior to any substantial solubilization of the calcium oxide to form an insoluble calcium-carbonate sheath on the particles, collecting the calcium-carbonate-coated particles of calcium oxide in the aqueous solution, settling the coated particles from the solution and recirculating it to scrub additional quantities of the gas after replenishing the carbonate or hydrogen carbonate ion content.

Where the gas is a converter waste gas, e.g. derived from a Bessemer, Thomas or other converter, it generally will contain sufficient levels of $CO_2$ so that at least part of the carbonate or hydrogen carbonate ion level can be maintained by solubilization of this gas component. To this end there is maintained a $CO_2$-solubilizing quantity of an alkali metal (Na, K, Li) in the recirculated solution. Most generally, however, small additions of these alkali-metal carbonates or hydrogen carbonates will be required.

According to the present invention alkali salts are used in the form of carbonates and/or hydrogen carbonates or alkali-hydroxides as additives to the washwater in a system for removing particles, in particular calcium-oxide particles, from gases containing carbon dioxide. After separation of the solid particles from the water by means of sedimentation and decantation and after the addition of fresh water to the wash water in order to replace that quantity lost, the wash water and the additive are recycled so as to inhibit the dissolving of the calcium from the calcium-oxide particles.

According to a particular feature of this invention soda ($Na_2CO_3$) is used as the additive.

The invention is based on the fact that the calcium oxide on the surface of the calcium-oxide particles becomes calcium hydroxide relatively slowly and that the thus formed calcium hydroxide, before it is dissolved in the water, is transformed by the carbon dioxide dissolved in the water into calcium carbonate. In this manner there is formed on the calcium-oxide particles a virtually inactive coating which completely eliminates any further reaction between the calcium oxide and the water or the calcium hydroxide with the carbon dioxide. Dissolved calcium thus is no longer present in the recycled wash water, as the inactivated calcium-oxide particles are readily and easily moved by the settling and decantation step. The lye or hydroxide ions formed by the reaction of the carbonate with the calcium hydroxide on the surface of the calcium-oxide particles react with the carbon dioxide in the waste gas to form soluble carbonates or hydrogen carbonates (bicarbonates). Thus it is necessary to dose the circulating wash water with a quantity of carbonate which is equal to the difference between the elutriated carbonate quantity and the newly formed carbonate quantity. Thus the additive according to the present invention is self-regenerating.

BRIEF DESCRIPTION OF THE DRAWING

The above and other objects, features and advantages will become more readily apparent from the following description reference being made to the accompanying drawing in which.

SPECIFIC DESCRIPTION

Figure 1:
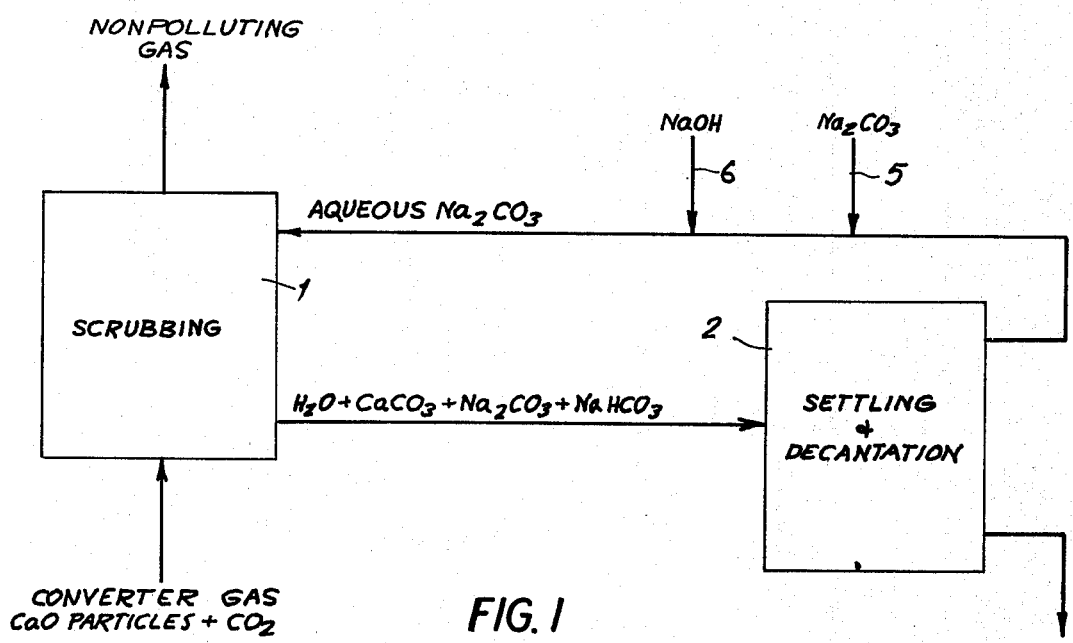
FIG. 1 is a largely schematic view illustrating the system according to the present invention.

As shown in FIG. 1 a converter gas containing calcium-oxide particles and carbon dioxide is passed upwardly through a scrubbing tower 1 as described in commonly assigned patent application Ser. No. 269,773 filed July 7, 1973 by G. HAUSBERG et al (now U.S. Pat. No. 3,906,078).

Figure 2:
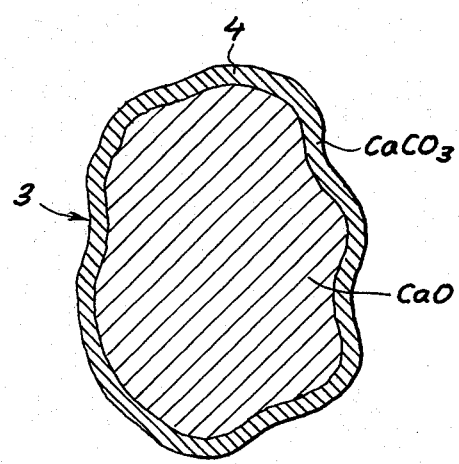
FIG. 2 is a large-scale view of a calcium-oxide particle illustrating the principles of the present invention.

Aqueous sodium carbonate is used as the scrubbing liquid so as to react with the calcium oxide particles and the carbon dioxide in the converter gas to form a solution and suspension that is settled, the liquid being decanted, at 2. As is shown in FIG. 2 the calcium oxide on the surface of a calcium-oxide particle 3 is converted relatively slowly into calcium hydroxide and which, before it is dissolved in the water, reacts with the carbonate dissolved in the water to form calcium carbonate. Thus a coating 4 of calcium carbonate is formed on each of the particles 3 so as to prohibit further reaction of the calcium oxide with the water or of calcium hydroxide with the carbon dioxide. Thus calcium ions themselves are not present in the wash water and the inactive calcium-oxide particles are readily removed at the elutriation step shown at 2.

The system is dosed at 5 with a quantity of carbonate equal to the difference between the amount of carbonate lost at the elutriation step and the newly formed carbonate. Caustic soda (NaOH) is added at 6 instead of sodium carbonate to treat the gas with a very high carbon dioxide content.

The necessary carbonate concentration in the wash water depends on the amount of time the water contacts the gas in the scrubbing tower 1, on the carbon-dioxide content of the gas, and on the quantity and particle size of the calcium-oxide particles in the gas. In accordance with the present invention between 0.2 and 2 g/l, preferably between 0.4 and 1 g/l of carbonate is used in the wash water. It is also within the scope of this invention to use alkali hydroxide rather than an alkali carbonate according to the carbon-dioxide concentration in the gas. Such an alkali hydroxide in one pass through the washer 1 reacts with the carbon dioxide to form carbonates.

The method according to the present invention can be used with the addition of very little fresh water so that it is indeed a closed system. In addition a relatively small quantity of the additives is also necessary so that the entire operation is relatively inexpensive.

SPECIFIC EXAMPLE

When the system according to the present invention is used with the prior-art method and an overall water volume of 5500 m³ and a throughflow in the washer 1 of 1040 m³/h, it is necessary to add to the circulating system 800 m³/h, of fresh water so as to replace 80 m³/h water lost through evaporation and 720 m³/h which is drawn off at the separation step to prevent the forming of deposits in the system.

Using the same overall water volume and the same throughflow in the washer 1, but adding to the fresh water in the system 5500 kg of soda, thus at a concentration of 1 kg/m³, it was possible to conduct the operation with loss of only 80 m³/h of the water at the elutriation step. This, added to the inevitable evaporation of 80 m³/h means that only 160 m³/h fresh water was necessary. In addition to this it was necessary to add 105 kg/h of the soda to the system, in which case there were absolutely no deposits in the system.

Thus in accordance with the present invention it is possible to save 640 m³/h of fresh water by using 105 kg/h of soda. Since one kilogram of soda costs approximately as much as 1 m³ of fresh water the system according to the present invention is clearly much less expensive to run than the prior-art system.

I claim:

1. A method of treating a gas containing calcium-oxide particles, said method comprising the steps of:
   scrubbing said gas with a liquid consisting essentially of an aqueous solution of alkali-metal carbonate or alkali-metal hydrogen carbonate to form an insoluble carbonate sheath on said particles prior to the solubilization of calcium ion therefrom and entraining the resulting calcium-carbonate coated particles with the solution;
   separating the entrained particles from said solution by settling and decantation of the solution;
   thereafter adding water to said solution and replenishing the carbonate or hydrogen carbonate concentration thereof to form a regenerated solution; and
   thereafter scrubbing additional quantities of said gas with said regenerated solution.

2. The method defined in claim 1 wherein said gas is a converter gas containing carbon dioxide in addition to said particles, and said solution is regenerated by adding an alkali metal carbonate, hydrogen carbonate or hydroxide to the solution.

3. The method defined in claim 2 wherein soda is used as said carbonate in a concentration between 0.2 g/l and 2 g/l.

4. The method defined in claim 3 wherein said soda is employed in a concentration of between 0.4 g/l and 1 g/l.

* * * * *